Sept. 11, 1956  H. C. WINKEL  2,762,543
PASTE CONTROL FOR BATTERY GRID PASTING MACHINE
Filed Aug. 26, 1955

INVENTOR.
HERBERT C. WINKEL
BY
ATTORNEY

United States Patent Office 2,762,543
Patented Sept. 11, 1956

2,762,543

PASTE CONTROL FOR BATTERY GRID PASTING MACHINE

Herbert C. Winkel, Watervliet, Mich.

Application August 26, 1955, Serial No. 530,692

8 Claims. (Cl. 226—39.6)

This invention relates in general to a machine for applying paste to battery grids as they are moved along a surface beneath a paste supplying hopper, and more particularly to a device for removing the excess paste from said grids as they leave said hopper.

The necessity for removal of excess paste from battery grids has created many problems in the operation of grid pasting machines of the type disclosed in my Patent No. 2,669,376. This removal is effected as the grid leaves the hopper within which an excess of paste may have been applied to the grid. Presently known devices intended to effect such removal include various types of rollers, scrapers and squeegees. These devices, even when they work at all, have proven generally unsatisfactory because they often remove too much paste from the grids, damage the grids, leave a scuffed or chattered surface on the paste, or wear out too quickly.

Accordingly, a primary object of this invention is the provision of a device for positively removing the excess paste from a grid, which device will not damage the grids, which will leave a smooth finish on the paste flush with the upper surface of the grid and which will simultaneously and uniformly position the paste within all interstices in the grids.

A further object of this invention is the provision of a device for removing excess paste, as aforesaid, which is simple to construct, which operates automatically, which can be easily adjusted for variations in grid sizes, which is easily and inexpensively adaptable to use with paste hoppers of the type disclosed in my aforesaid patent and presently in use, and which has long wearing characteristics.

A further object of the invention is to provide a protecting device for a paste smoothing squeegee for protecting same from damage caused by rough grids and for minimizing wear thereof.

Other objects and purposes of this invention will become apparent to persons familiar with this type of equipment upon reading the following specification and examining the accompanying drawings, in which.

Figure 1:
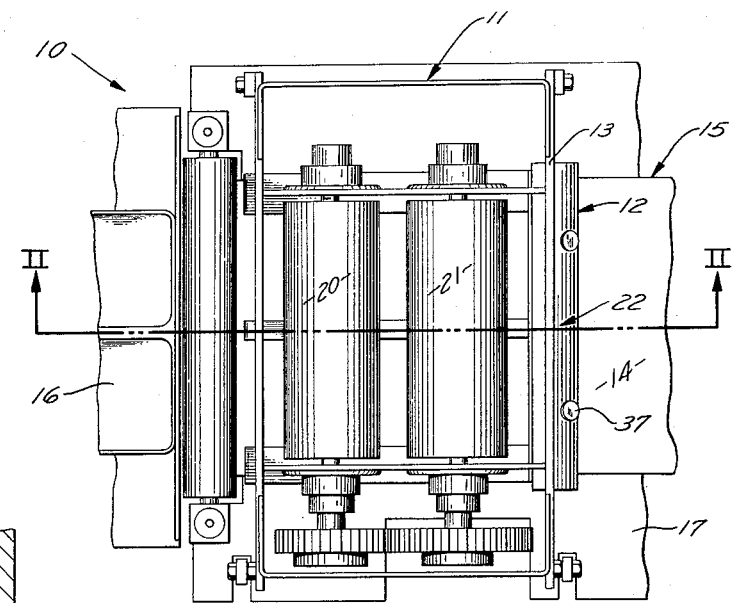
Figure 1 is a fragmentary, top plan view of a battery grid pasting machine including the paste hopper mounted thereon.
Figure 2:
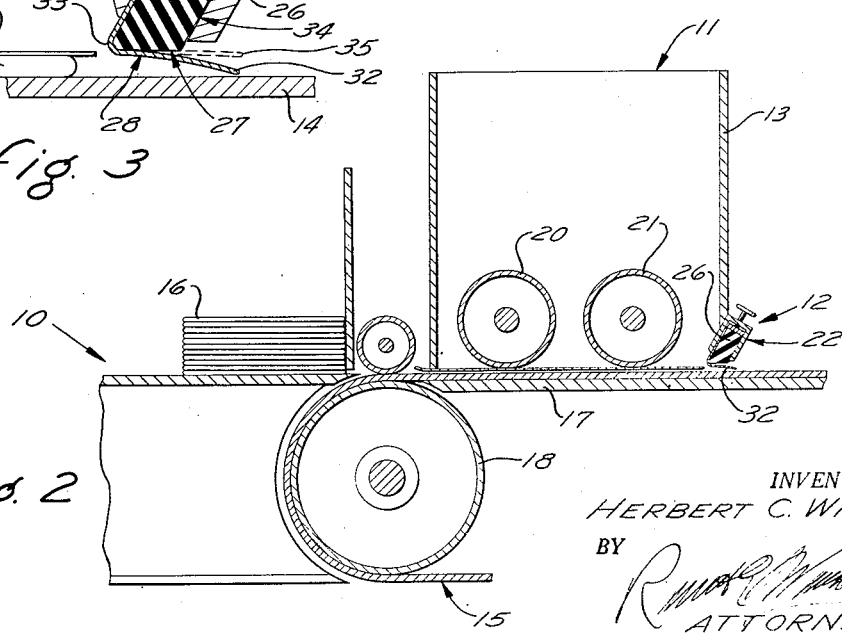
Figure 2 is a sectional view substantially as taken along the line II—II of Figure 1.

For the purpose of convenience in description, the terms "upper," "lower" and derivatives thereof will have reference to the structure as appearing in Figure 2. The terms "front," "rear" and derivatives thereof will have reference to the lower and upper ends, respectively, of the structure as shown in Figure 1. The terms "leading," "trailing" and derivatives thereof will have reference to the leftward and rightward ends, respectively, of the machine as appearing in Figures 1 and 2. The terms "inner," "outer" and derivatives thereof will have reference to the geometric center of the machine and parts thereof.

In order to meet the objects and purposes of this invention, I have provided a battery grid pasting machine 10 (Figures 1 and 2) of the type disclosed in my Patent No. 2,669,376 having a hopper 11 located near the leading end thereof. The paste control 12, to which this invention primarily relates, is mounted on the trailing wall 13 of said hopper 11 adjacent to, and transverse of, the upper course 14 of a flat, endless conveyor belt 15. The paste control 12 removes the excess paste from grids 16 as they are moved on said conveyor belt 15 beneath said paste control 12.

*Detailed description*

As shown in Figures 1 and 2, the pasting machine 10 is provided with a flat, horizontal, belt support plate 17 which extends beneath the hopper 11. The conveyor belt 15 passes around a drum 18 having a horizontal axis located at the leading end of said support plate 17. The drum 18 is preferably substantially tangent along its upper surface with the plane defined by the upper surface of the support plate 17. Thus, the upper course 14 of the conveyor belt 15 can move smoothly from the drum 18 onto and along the support plate 17 beneath said hopper 11. The conveyor belt 15 is driven by means, and in a manner, of any known type, such as that disclosed in detail in my above mentioned patent.

The hopper 11 is provided with a pair of parallel mixing and applicator rolls 20 and 21 rotatably mounted upon and within the hopper 11 near the lower end thereof for rotation about axes substantially parallel with the axis of the drum 18. Paste of any convenient, conventional type is disposed within the hopper 11, where it is mixed and applied to the battery grids 16 as they are conveyed beneath said mixing rolls 20 and 21 by the upper course 14 of the conveyor belt 15.

The paste control device 12 (Figures 1, 2 and 3), is mounted upon, and located along the lower edge of, the trailing wall 13 of the hopper 11. Said paste control 12 is comprised of an elongated, channel-shaped body 22 having a web portion 23 and a pair of flanges 24 and 25 which are substantially perpendicular to said web 23. Said flanges 24 and 25, in one preferred embodiment of my invention, are disposed at an angle of approximately 60° to the support plate 17 (Figure 2) and said channel 22 opens downwardly toward the upper course 14. An elongated, resilient member 26 is disposed within, and extends downwardly from, the channel 22 toward said upper course 14. The lower surface 27 of said member 26 is preferably substantially parallel with the upper course 14 and spaced therefrom a distance approximately equal to the thickness of a grid 16.

A flexible strip 28 (Figure 3), having a substantially L-shaped cross-section, is mounted between and supported by the channel 22 and the resilient member 26. The flexible strip 28 has an upright flange 29 which may be bonded to the leading face 31 of the resilient member 26 adjacent to the flange 24 of the channel 22. The lower flange 32 of said strip 28 extends along and beneath the lower surface 27 of the resilient member 26 toward the trailing end of the machine 10. The junction 33 between the flanges 29 and 32 of the strip 28 is preferably rounded so that it will cause no damage to the grids 16 as they pass thereunder.

The flange 32 is preferably curved downwardly away from the resilient member 26, as shown in solid lines in Figure 3, so that the trailing edge of flange 32 is closest to the plate 17, said flange defining a portion of a cylinder whose axis is parallel with, and below, the upper surface of said belt 14. A tangent to the surface of said flange 32, adjacent to said trailing edge thereof is preferably disposed at an angle of from approximately 5° to approximately 15°, and preferably about 10°, to the upper surface of said belt 14. As a grid 16 is conveyed beneath the flange 32 by the belt 15 said flange 32 is moved upwardly into its broken line position 35 (Figure 3).

An adjustment bar 36 is disposed within the channel 22 between the upper edge of the resilient member 26 and the web 23. Said bar 36 is engaged by one or more adjustment screws 37 threadedly received through appropriate openings in the web 23. The resilient member 26 is snugly disposed and gripped between the flanges 24 and 25 of the channel 22 so that some material force is required to urge said resilient member 26 out of the channel 22. The channel 22 may be secured to the trailing wall 13 of the hopper 11 in any convenient, conventional manner, as by welding. Although the flanges of said channel 22 are preferably disposed at an angle of about 30° to the trailing wall 13 in this particular embodiment, it will be recognized that variations of this angular relationship are fully contemplated. It will be also recognized that the angular relationship between the tangent to the flange 32 and the lower surface of the resilient member 26 may also be varied within the scope of this invention.

*Operation*

Figure 3:
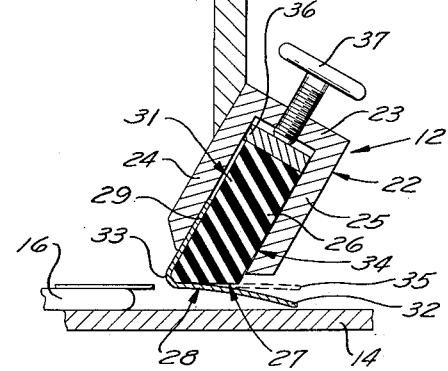
Figure 3 is an enlarged fragment of Figure 2 including the improvement to which this invention relates.

As shown particularly in Figures 2 and 3, a grid 16 is urged onto the upper course 14 of the conveyor belt 15 and thence is moved thereby beneath the mixing rolls 20 and 21 in said hopper 11 where paste is applied to said grid. The grid is then moved on said conveyor belt under the trailing wall 13 of the hopper 11 and beneath the paste control 12 which removes the excess paste from the upper surface of the grid 16. The resilience of the member 26 allows for any irregularities in the thickness of the grids 16 while at the same time providing, in combination with the flexible, lower flange 32 of the strip 28, a means for securing a smooth, uniform surface upon the paste in the grid. The flange 32 acts like a trowel in applying said smooth surface to the paste in the grid while removing the excess paste therefrom and retaining it within the hopper 11. The arched shape of the lower flange 32 has been found to improve very materially the manner in which said uniform surface is provided on the paste.

Thus, by combining a flexible strip 28 with a resilient member 26 so that both said strip and member can flex upwardly and downwardly with respect to the conveyor belt 15, a durable, wear-resistant paste control 12 is provided. An unbroken and unscuffed surface can be applied to the paste in the grid 16 as it passes beneath the paste control 12 while, at the same time, the excess paste is effectively removed from said grid. By means of the adjustment screw 37 acting upon the adjustment bar 36, the resilient member 26 can be moved upwardly and downwardly with respect to the conveyor belt 15. Such adjustments are made to compensate for changes in grid thickness, paste texture and the like.

Although a particular, preferred embodiment of my invention has been described and disclosed herein for illustrative purposes, it will be understood that variations or modifications thereof which lie within the scope of the invention are fully contemplated unless specifically stated to the contrary in the appended claims.

I claim:

1. In a machine for applying paste to a battery grid moving along a surface beneath a paste hopper, said paste hopper having a trailing wall, a device for removing the excess paste from said grid, comprising: an elongated, resilient compressible element disposed along the lower edge of said wall and extending therefrom toward said surface; an elongated, flexible non-compressible member normally having a substantially L-shaped cross-section, one flange of said member being held against the leading side of said element and the other flange of said member extending between said element and said surface.

2. In a machine for applying paste to a battery grid moving along a surface beneath a paste hopper, said hopper having a trailing wall, a device for removing the excess paste from said grid, comprising: an elongated channel secured on the lower edge of said wall parallel with, and opening toward, said surface; an elongated, resilient element disposed within said channel and extending therefrom toward said surface; an elongated, flexible non-compressible member normally having a substantially L-shaped cross-section, one flange of said member being snugly held between the leading side of said element and the adjacent flange of said channel, and the other flange of said strip extending between said element and said surface, said other flange being normally slightly curved away from said element toward said surface.

3. The structure of claim 2 wherein said channel is transverse to the path of movement of said grid, and the flanges of said channel are both sloped downwardly and inwardly from said trailing wall at an angle of approximately 60° to said surface.

4. The structure of claim 2 wherein said channel is transverse to the path of movement of said grid, and the trailing portion of said other flange of said flexible member is disposed at an angle of from approximately 5° to approximately 15° to said surface.

5. The structure of claim 4 wherein said other flange of said flexible member defines a portion of a cylinder having an axis parallel with and below said surface.

6. The structure of claim 2 wherein adjustment means, including an elongated bar located between said resilient element and the web of said channel is mounted within said channel for controlling the downward extension of said element from said channel.

7. The structure of claim 2 wherein said machine has a flat endless belt, the upper course of which conveys said grid along said surface, said channel is located transversely of said upper course, said resilient element is normally spaced from said course a distance slightly less than the thickness of said grid, and the trailing edge of said other flange of said flexible member is normally disposed closest to said upper course.

8. In a machine for applying paste to a battery grid moving along a surface beneath a paste hopper, a device for removing the excess paste from said grid, comprising: an elongated element capable of exerting a predetermined pressure on said grids, said element being mounted above and spaced from said surface a distance substantially equal to the thickness of a grid and having a substantially planar lower wall substantially parallel to said surface; a flexible, non-compressible, wear resistant plate normally extending from the forward edge of said wall between said wall and said surface, said plate flexing into substantial parallelism and engagement with said wall when a grid passes between said plate and said surface so that said plate is urged under said predetermined pressure into engagement with the grid.

References Cited in the file of this patent

UNITED STATES PATENTS

| 200,286 | Harbin | Feb. 12, 1878 |
| 2,669,376 | Winkel | Feb. 16, 1954 |

FOREIGN PATENTS

| 24,090 | Australia | Dec. 10, 1929 |